US007998262B2

(12) United States Patent
Nochi

(10) Patent No.: US 7,998,262 B2
(45) Date of Patent: Aug. 16, 2011

(54) MERCHANDISE SALES PROCESSING APPARATUS

(75) Inventor: Masatoshi Nochi, Shizuoka (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 302 days.

(21) Appl. No.: 12/350,734

(22) Filed: Jan. 8, 2009

(65) Prior Publication Data

US 2009/0178562 A1 Jul. 16, 2009

(30) Foreign Application Priority Data

Jan. 10, 2008 (JP) ................................ 2008-003292

(51) Int. Cl.
*B01D 46/46* (2006.01)

(52) U.S. Cl. ....... 96/417; 55/385.6; 55/428; 55/DIG. 34

(58) Field of Classification Search ................. 55/385.1, 55/385.2, 385.6, 428–430, DIG. 3, DIG. 18, 55/DIG. 34; 454/184, 192; 312/1, 209, 211, 312/212, 229, 237; 353/57; 361/679.48, 361/695; 700/32, 275, 300; 96/417, 422, 96/424, 397
See application file for complete search history.

(56) References Cited

U.S. PATENT DOCUMENTS

| | | | | |
|---|---|---|---|---|
| 6,660,055 | B2 * | 12/2003 | How et al. | 55/385.2 |
| 6,758,876 | B2 * | 7/2004 | Suzuki et al. | 55/385.6 |
| 7,677,962 | B2 * | 3/2010 | Chang | 454/184 |
| 7,686,860 | B2 * | 3/2010 | Ryan | 55/429 |
| 2002/0027766 | A1 * | 3/2002 | Negishi | 361/645 |
| 2002/0036886 | A1 * | 3/2002 | Negishi | 361/645 |
| 2007/0220849 | A1 * | 9/2007 | Ryan | 55/429 |
| 2009/0299531 | A1 * | 12/2009 | Kitamura et al. | 700/275 |

FOREIGN PATENT DOCUMENTS

| | | |
|---|---|---|
| JP | 57161033 | 3/1956 |
| JP | 2000325719 | 11/2000 |
| JP | 2001036273 | 2/2001 |
| JP | 2001-284865 | 10/2001 |
| JP | 2004301877 | 10/2004 |

OTHER PUBLICATIONS

Japanese Office Action dated Nov. 24, 2009 corresponding to U.S. Appl. No. 12/350,734, filed Jan. 8, 2009.
Japanese Office Action dated Mar. 23, 2010 corresponding to U.S. Appl. No. 12/350,734, filed Jan. 8, 2009.

* cited by examiner

*Primary Examiner* — Duane Smith
*Assistant Examiner* — Minh-Chau Pham
(74) *Attorney, Agent, or Firm* — Turocy & Watson, LLP

(57) ABSTRACT

A dust collector is provided in the main body of a POS terminal so that the dust in the main body can be caught into the dust collector.

11 Claims, 5 Drawing Sheets

MERCHANDISE SALES PROCESSING APPARATUS

CROSS-REFERENCE TO RELATED APPLICATIONS

This application is based upon and claims the benefit of priority from prior Japanese Patent Application No. 2008-003292, filed Jan. 10, 2008, the entire contents of which are incorporated herein by reference.

BACKGROUND OF THE INVENTION

1. Field of the Invention

The present invention relates to a merchandise sales processing apparatus, such as a POS terminal, which is utilized in sales of merchandise.

2. Description of the Related Art

A merchandise sales processing apparatus utilized in sales of merchandise, such as a point-of-sales (POS) terminal, comprises a control unit on which an IC and a microcomputer are mounted. In accordance with increases in the processing capacity and speed, heat generated by this control unit is increased. In order to deal with such heat generation, the control unit is provided with a heat sink (see Jpn. Pat. Appln. KOKAI Publication No. 2001-284865, for example).

Furthermore, a vent aperture is formed in the main body of the POS terminal, with an exhaust fan provided in the aperture, as measures against the heat generation. When the fan is running, the hot air is discharged from the main body.

Inside the main body of the POS terminal, the inner wall and the control circuit board tend to become covered with dust. The dust must be removed on a regular basis or whenever it is necessary because it may adversely affect the functioning of the electronic components on the control circuit board.

Dust, however, gets into minute gaps between the electronic components, which makes removal of the dust by hand an irksome task, requiring time and effort.

BRIEF SUMMARY OF THE INVENTION

The purpose of the present invention is to offer a merchandise sales processing apparatus that can automatically and reliably remove dust from the inside of the main body without any irksome manual task.

The merchandise sales processing apparatus according to the present invention comprises a dust collector arranged inside the main body, and a container detachably arranged in the main body to store dust collected by the dust collector.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

(1) Embodiment 1

Figure 1:
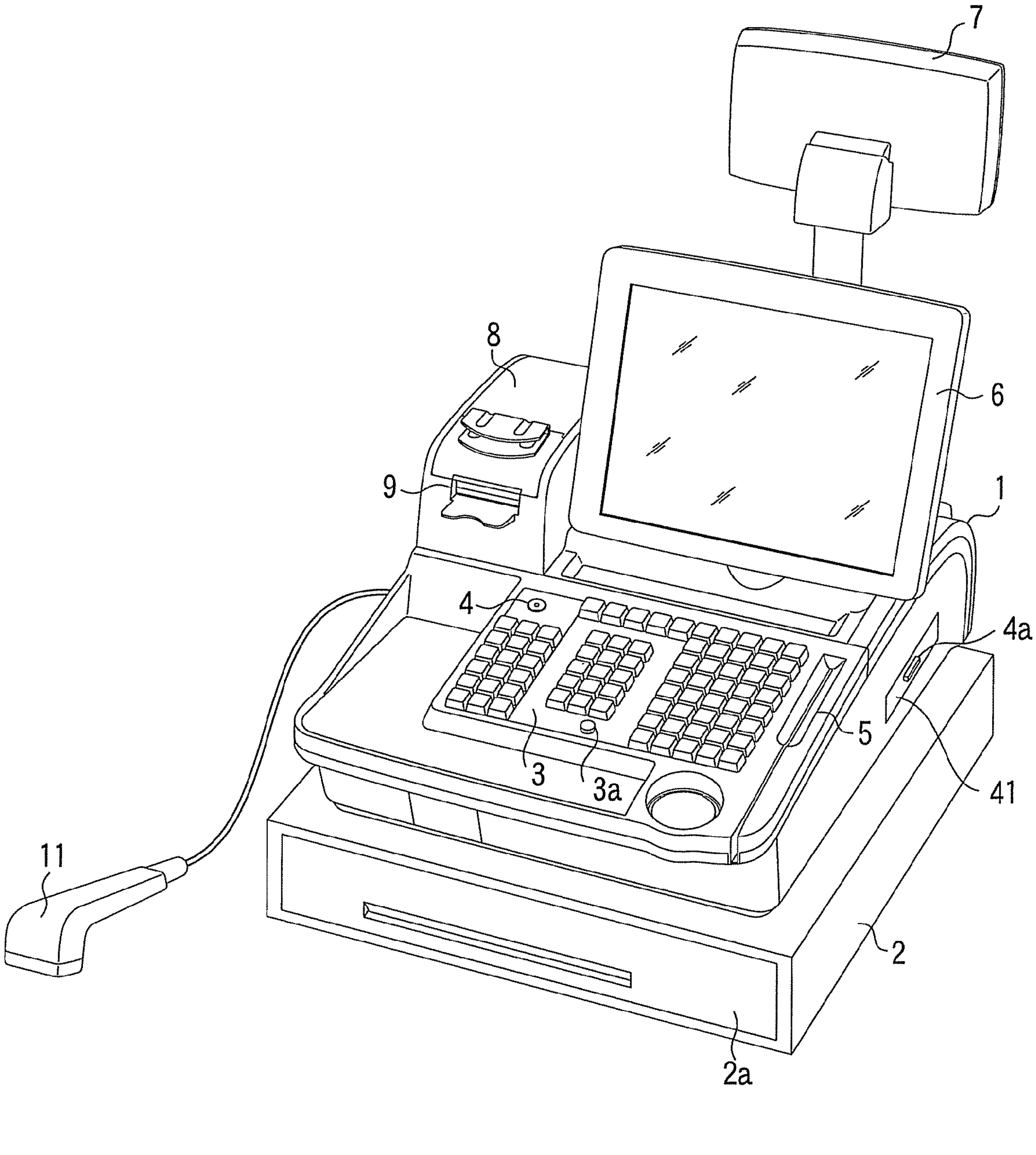
FIG. 1 is a perspective view of an apparatus according to the present embodiments.

The first embodiment of the present invention will be explained below with reference to the drawings. FIG. 1 is an external view of a merchandise sales processing apparatus such as a POS terminal.

A POS terminal 1 comprises a drawer section 2 having a drawer 2*a* in which cash and the like is stored and a main body situated on the drawer section 2. The POS terminal 1 is installed at a checkout section of a retail store, for example. The main body is provided with a keyboard 3, a mode switch 4, a card reader 5 and an operator display (color liquid crystal display) 6 on the top front, and a customer display (color liquid crystal display) 7 on the back. The main body is also provided with an electronic journal 8 to store a journal in an electronic medium and a printer 9 to print out receipts and the journal.

Furthermore, a merchandise information input unit such as a barcode scanner 11 is led out from the main body. This barcode scanner 11 optically reads information attached to a product, or in other words a barcode printed on a label or the like of the product. The keyboard 3 includes numerical keys to replace the amount of money received from a customer or the like with numerals, a subtotal key to issue an instruction to output the total price of merchandise registered for sales in one transaction, a total key to issue an instruction to declare a cash settlement for the price of the transaction and complete the transaction, a clear key to issue an instruction to clear the numerical data, and the like.

The mode switch 4 selectively sets up any one of "register", "inspection", "reset", "setup", and "stop" modes, which are switched around with a special key. All the modes except for "stop", i.e., "register", "inspection", "reset" and "setup" correspond to modes for execution of the merchandise sales process.

The card reader 5 reads data from a non-cash payment card when the card is inserted and swiped. The operator display 6 indicates names and prices of items registered for sales, the total price of the transaction, an amount received from the customer, an amount of change and the like. The customer display 7 indicates customer service information such as a welcome message given as advertisement information including color still/moving images, a breakdown of the transaction (item names, unit prices, and numbers of units), outcomes of the transaction (total price, received amount and amount of change) and the like.

Figure 2:
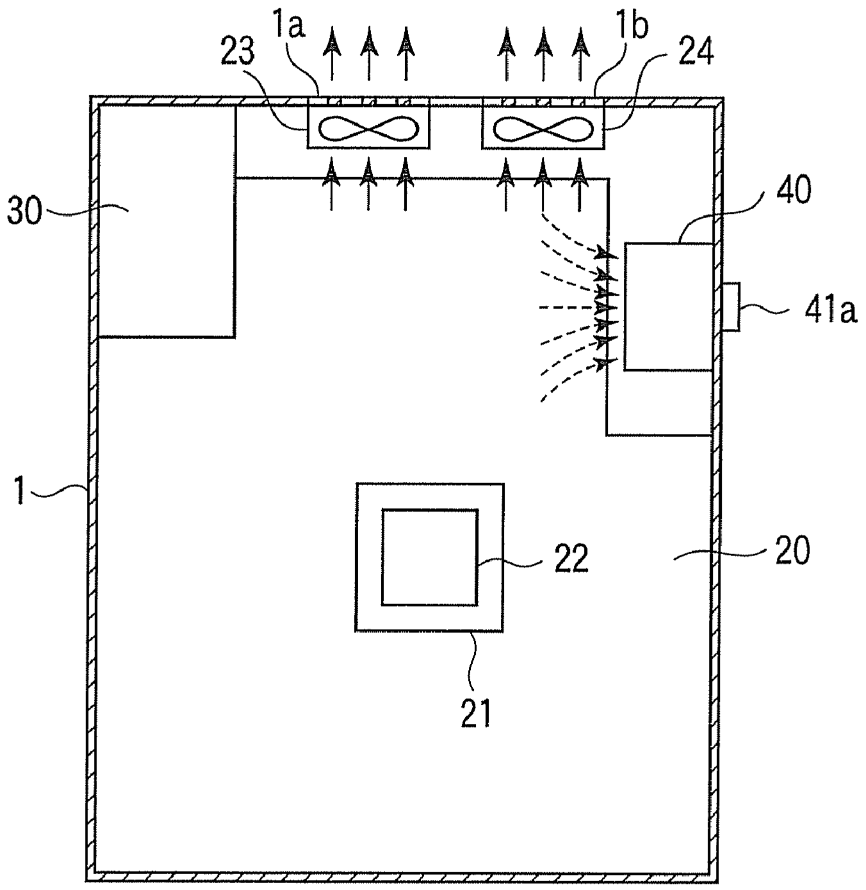
FIG. 2 is a sectional view of the main body of the apparatus, showing components that are relevant to the present embodiments.

The arrangement of the relevant components inside the main body of the POS terminal 1 is illustrated in FIG. 2.

A control circuit board (also referred to as a mother board) 20 and a power supply unit 30 are provided in the main board. A control unit 21, such as an IC and LSI, is mounted on the control circuit board 20. A heat sink 22 is arranged on the top surface of the control unit 21. On the side that is in contact with the top surface of the control unit 21, the heat sink 22 includes heat dissipation fins spaced apart from one another so that the heat generated by the control unit 21 can be effectively dissipated. The power supply unit 30 outputs an operating voltage of the POS terminal 1.

Vent apertures 1*a* and 1*b* are provided in the back portion of the main body. Exhaust fans 23 and 24 are arranged inside the vent apertures 1*a* and 1*b*, respectively. When the exhaust fans 23 and 24 start operating, the air heated inside the main body due to the heat released from the control unit 21 and the heat sink 22 is dissipated through the vent apertures 1*a* and 1*b*.

Figure 3:
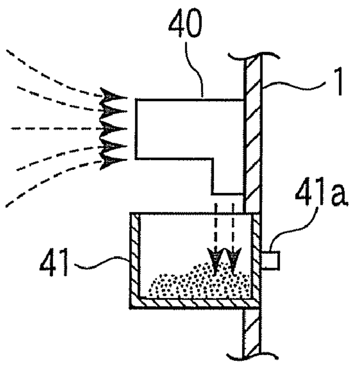
FIG. 3 is a diagram showing the structure of a dust collector and container according to the present embodiments.

A dust collector 40 that collects dust by generating plasma or ions is arranged in the vicinity of the exhaust fans 23 and 24 of the main body, or in other words, downstream of the air flow produced in the main body. The dust caught by the dust collector 40 is released into a container 41 that is arranged below the dust collector 40, as illustrated in FIG. 3. The container 41 is exposed and flush with the side surface of the main body, as illustrated in FIG. 1, and pushed in and pulled out by gripping a pull 41*a*.

Figure 4:
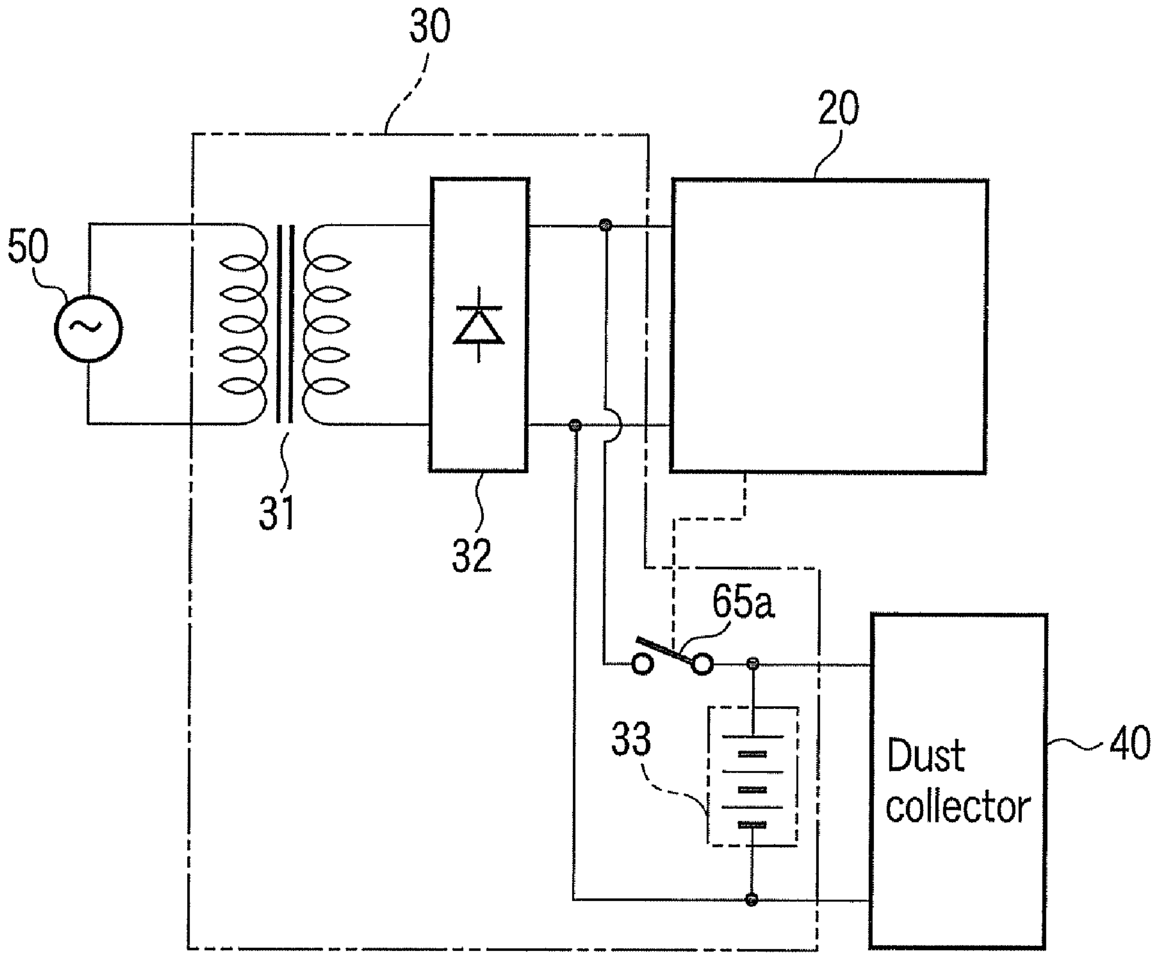
FIG. 4 is a block diagram showing a power supply unit according to the present embodiments.

As illustrated in FIG. 4, the power supply 30 includes a power transformer 31 connected to a commercial alternating current power supply 50, a rectifier circuit 32 connected to the secondary side of the power transformer 31, and a battery 33 connected to the output terminal of the rectifier circuit 32 by way of a contact 65*a* of a dust collector control relay 65, which will be described later. The power unit 30 outputs an operating voltage to the control circuit on the control circuit board 20, and supplies this operating voltage to the dust collector 40 while applying the voltage to the battery 33 by way of the contact 65*a*. The battery 33 is designed to be charged and discharged by making and breaking the contact 65*a*. When the contact 65*a* is made, the voltage is stored in the battery 33, and when the contact 65*a* is broken, the stored voltage is discharged. The discharged voltage becomes the operation voltage of the dust collector 40.

Figure 5:
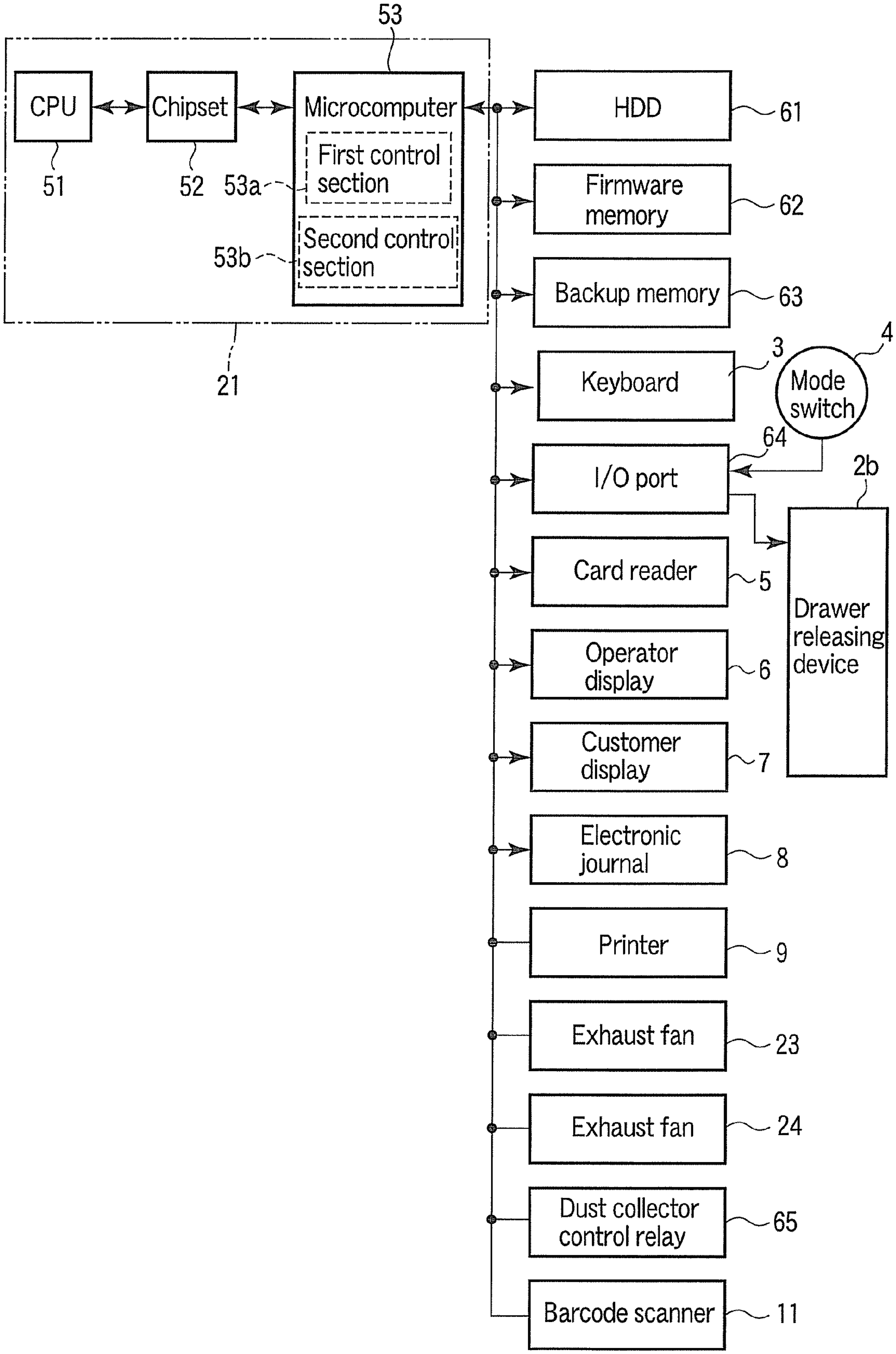
FIG. 5 is a block diagram showing a control circuit according to the first embodiment.

The control circuit of the control circuit board 20 is illustrated in FIG. 5.

The control unit 21 is constituted by a central processing unit (CPU) 51, a chipset 52 and a microcomputer 53. The control unit 21 is connected to a hard disk drive (HDD) 61, a firmware memory 62, a backup memory 63, the keyboard 3, an input/output (I/O) port 64, the card reader 5, the operator display 6, the customer display 7, the electronic journal 8, the printer 9, the exhaust fans 23 and 24, the dust collector control relay 65 and the barcode scanner 11.

The hard disk drive 61 stores therein an operating system (OS) and application programs necessary for the control unit 21 to perform the processes. The firmware memory 62 stores therein minimum firmware necessary for the control unit 21 to perform at least the process of registering merchandise. The backup memory 63 stores therein merchandise registration data received by the control unit 21 during the resume process. The I/O port 64 is connected to a drawer releasing device 2*b* to open the drawer section 2.

The microcomputer 53 of the control unit 21 includes a first control section 53*a* and a second control section 53*b* as essential functions pertinent to the operation of the dust collector 40.

The first control section 53*a* brings the main body into operation and executes various processes for merchandise sales when the mode switch 4 is set to the "register" mode. At the same time, the first control section 53*a* energizes the dust collector control relay 65.

The second control section 53*b* stops the operation of the main body and de-energizes the dust collector control relay 65 when the mode switch 4 is set to the "stop" mode.

Next, the effects of the present embodiment will be explained.

When the mode switch 4 is set to the "register" mode, the main body is brought into operation so that all the units including the control unit 21 and the exhaust fans 23 and 24 start operating and the dust collector control relay 65 is energized. By the operation of the exhaust fans 23 and 24, hot air in the main body including the heat released from control unit 21 and the heat sink 22 is discharged through the vent apertures 1*a* and 1*b*. Furthermore, the contact 65*a* is closed due to the dust collector control relay 65 that is energized, and thereby an operating voltage is supplied from the power supply unit 30 to the dust collector 40. As a result, the dust collector 40 is initiated to collect dust from the main body. The collected dust is contained in the container 41 below the dust collector 40. When the contact 65*a* is closed, the battery 33 is charged.

When the mode switch 4 is set to the "stop" mode, the operations of all the units including the control unit 21 and the exhaust fans 23 and 24 are ceased, and the dust collector control relay 65 is de-energized. In accordance with this de-energization, the contact 65*a* is released, and the charge state of the battery 33 is terminated to start discharging. With the discharged voltage, the dust collector 40 continues its operation.

The user or maintenance personnel can remove the container 41 from the main body by gripping the pull 41*a* and pulling out the container 41. When the container 41 is full of dust, it can be turned upside down and emptied out. After the cleanup, the container 41 is replaced in the main body.

Because of the dust collector 40 provided in the main body, the dust can be automatically removed from the inside of the main body without any irksome manual labor. In this manner, dust-related malfunctions of the electronic components can be avoided. The dust can be efficiently and reliably removed from the inside of the main body especially because the position of the dust collector is determined to be in the vicinity of the exhaust fans 23 and 24 in the main body, or in other words, downstream of the airflow produced in the main body.

In addition, the battery 33 is charged during the operation of the main body so that the dust collector 40 can continue to operate by use of the charged voltage when the main body is not operating. Thus, the dust collector 40 can keep operating for long hours while holding down the power consumption of the commercial alternating current power supply 50. This produces the energy saving effects.

(2) Embodiment 2

The second embodiment of the present invention will be explained below. According to the second embodiment, the modes of the mode switch 4 can be selected from "register", "inspection", "reset", "setup", "stop", and also "dust collection" to bring the dust collector 40 into operation.

Figure 6:
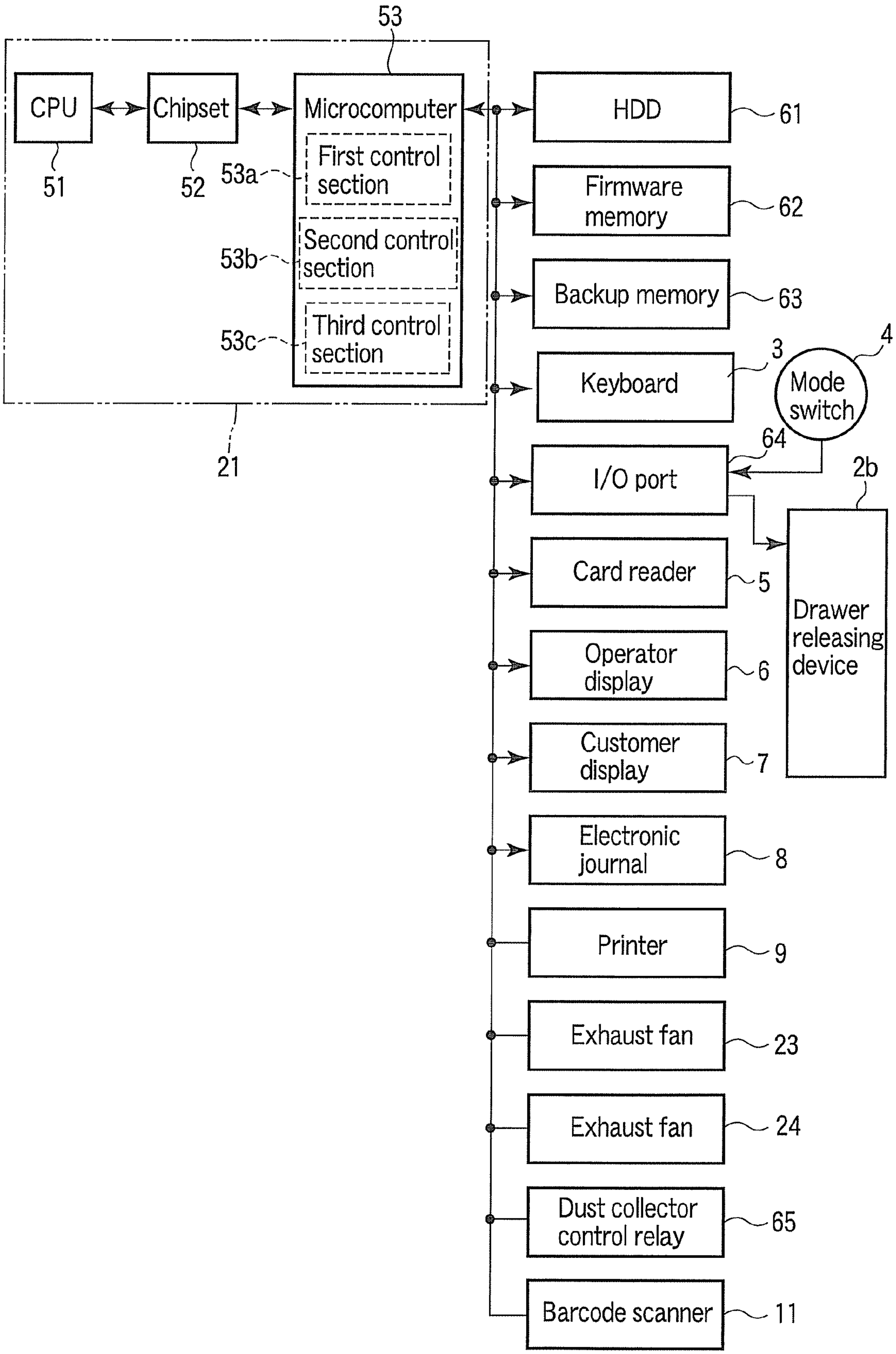
FIG. 6 is a block diagram showing a control circuit according to the second embodiment.

Accordingly, the microcomputer 53 of the control unit 21 is provided with a third control section 53*c* in addition to the first control section 53*a* and the second control section 53*b*, as illustrated in FIG. 6, as key functions that are related to the operation of the dust collector 40.

The control section 53*c* energizes the dust collector control relay 65 when the mode switch 4 is set to the "dust collection" mode.

The effect of the present embodiment will be explained.

When the mode switch 4 is set to the "register" mode, the main body is brought into operation, and the control unit 21 and the exhaust fans 23 and 24 thereby start running. With the operation of the exhaust fans 23 and 24, the hot air inside the main body including the heat released from the control unit 21 and the heat sink 22 is dissipated through the vent apertures 1*a* and 1*b*. When the mode switch 4 is set to the "stop" mode, the operations of all the units including the control unit 21 and the exhaust fans 23 and 24 come to a halt.

On the other hand, when the mode switch 4 is set to the "dust collection" mode, the dust collector control relay 65 is energized. Then, the contact 65*a* is closed so that the power supply unit 30 supplies the operating voltage to the dust collector 40. The dust collector 40 thereby starts operating, and the dust in the main body is caught into the dust collector 40. At this step, no sales-related process is executed. The collected dust is sent to the container 41 arranged below the dust collector 40. When the contact 65*a* is closed, the battery 33 is charged.

When the dust collector 40 is in operation and the mode switch 4 is set to the "stop" mode, the dust collector control relay 65 is de-energized. Then, the contact 65*a* is released, the charge state of the battery 33 is terminated, and the battery 33 starts discharging. With the discharged voltage, the dust collector 40 can continue to operate.

According to the present embodiment, the "dust collection" mode is added to the mode positions of the mode switch 4 so that the dust collector 40 can be independently operated when the "dust collection" mode is selected. Hence, the dust collector 40 can be operated when dusting only is needed.

The apparatus may be designed such that the operator display 6 presents characters or some pattern to indicate that the dust collector 40 is in operation when the mode switch 4 is set to the "dust collection" mode.

The rest of the structure, operation and effect is the same as the first embodiment, and thus the explanation thereof is omitted.

(3) Modifications

In the above embodiments, a sensor may be provided to detect that the container 41 is pulled out of the main body and pushed into the main body. With this sensor, the operation of the dust collector 40 can be suspended when the pull-out of the container 41 is detected, and the operation of the dust collector 40 can be resumed when the insertion of the container 41 is detected.

Furthermore, the POS terminal is used as an example of the merchandise sales processing apparatus in the explanation of the above embodiments, but an electronic cash resister and other apparatus may be equally incorporated.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A merchandise sales processing apparatus comprising:

a dust collector arranged inside a main body of the apparatus;

a container detachably arranged in the main body of the apparatus to store dust collected by the dust collector;

a power supply unit that is connected to a commercial power supply and outputs an operating voltage, includes a relay which has a contact to open and close a channel for supplying the operating voltage to the dust collector, and includes a battery which charges the operating voltage to the dust collector when the contact of the relay is closed and discharges the charged operating voltage to the dust collector when the contact of the relay is open;

a mode switch which selectively sets a merchandise sales process execution mode and a stop mode; and a control unit which operates by the outputted operating voltage from the power supply, closes the contact of the relay when the mode switch is set to the merchandise sales process execution mode, and opens the contact of the relay when the mode switch is set to the stop mode.

2. An apparatus according to claim 1, further comprising:

an exhaust fan that dissipates air from the main body of the apparatus.

3. An apparatus according to claim 2, wherein:

the dust collector is arranged in the vicinity of the exhaust fan.

4. An apparatus according to claim 1, further comprising:

at least one vent aperture formed in the main body of the apparatus; and at least one exhaust fan arranged inside the vent aperture of the main body of the apparatus to dissipate air from the main body through the vent aperture.

5. An apparatus according to claim 4, wherein:

the dust collector is arranged at a position downstream of airflow produced by the exhaust fan.

6. An apparatus according to claim 1, further comprising:

a control circuit board arranged inside the main body of the apparatus;

wherein the control unit is arranged on the control circuit board.

7. An apparatus according to claim 6, further comprising:

a heat sink attached to the control unit.

8. An apparatus according to claim 1, wherein:

the mode switch includes a dust collection mode in which the dust collector is brought into operation, in addition to the merchandise sales process execution mode and the stop mode.

9. An apparatus according to claim 8, wherein:

the control unit includes:

a first control section which energizes the relay and closes the contact of the relay when the mode switch is set to the merchandise sales process execution mode;

a second control section which de-energizes the relay and opens the contact of the relay when the mode switch is set to the stop mode; and a third control section which energizes the relay and closes the contact of the relay when the mode switch is set to the dust collect mode.

10. An apparatus according to claim 1, wherein the control unit executes various merchandise processes when the mode switch is set to the merchandise sales process execution mode.

11. An apparatus according to claim 2, wherein the control unit stops the operation of the exhaust fan when the mode switch is set to the stop mode.

* * * * *